US009450499B2

(12) United States Patent
Takagi et al.

(10) Patent No.: US 9,450,499 B2
(45) Date of Patent: Sep. 20, 2016

(54) ELECTRIC POWER CONVERSION CIRCUIT SYSTEM

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Kenichi Takagi, Nagakute (JP); Masanori Ishigaki, Nagakute (JP); Takahide Sugiyama, Nagakute (JP); Takaji Umeno, Nagakute (JP); Kenichiro Nagashita, Toyota (JP); Takahiro Hirano, Toyota (JP); Jun Muto, Toyota (JP)

(73) Assignees: KABUSHIKI KAISHA TOYOTA CHUO KENKYUSHO, Nagakute-Shi (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 61 days.

(21) Appl. No.: 14/630,051

(22) Filed: Feb. 24, 2015

(65) Prior Publication Data

US 2015/0244279 A1    Aug. 27, 2015

(30) Foreign Application Priority Data

Feb. 26, 2014 (JP) ................................. 2014-035186

(51) Int. Cl.
*H02M 3/335* (2006.01)
*H02M 1/00* (2006.01)

(52) U.S. Cl.
CPC ..... *H02M 3/33584* (2013.01); *H02M 3/33561* (2013.01); *H02M 2001/0022* (2013.01)

(58) Field of Classification Search
CPC ................ H02M 2001/0022; H02M 3/33584; H02M 3/33561
USPC .......................................................... 363/17
See application file for complete search history.

(56) References Cited

U.S. PATENT DOCUMENTS 7,177,163 B2 *    2/2007    Eguchi .............. H02M 3/33592
                                                           363/132
2008/0252271 A1    10/2008    Iwamura
(Continued)

FOREIGN PATENT DOCUMENTS

DE    11 2006 000 761 T5    1/2008
JP    2011-193713 A    9/2011
(Continued)

OTHER PUBLICATIONS

Feb. 18, 2016 Office Action issued in German Application No. 10 2015 102 723.2.
(Continued)

*Primary Examiner* — Jessica Han
*Assistant Examiner* — Demetries A Gibson
(74) *Attorney, Agent, or Firm* — Oliff PLC

(57) ABSTRACT

There is provided an electric power conversion circuit system having a primary side electric power conversion circuit, a secondary side electric power conversion circuit, and a control circuit. The control circuit sets at least one of a half-bridge phase difference between a lower-left-arm transistor and a lower-right-arm transistor of the primary side electric power conversion circuit and a half-bridge phase difference of the secondary side electric power conversion circuit based on OFF periods of the primary side and secondary side electric power conversion circuits, dead-times of the primary side and secondary side electric power conversion circuits, and an amount of change of a power supply voltage so that a current in a non-transmission period of electric power is zero between the primary side and secondary side electric power conversion circuits.

6 Claims, 12 Drawing Sheets

(56) References Cited

U.S. PATENT DOCUMENTS

| | | | |
|---|---|---|---|
| 2009/0051346 A1 | 2/2009 | Manabe et al. | |
| 2010/0224428 A1 | 9/2010 | Yamada et al. | |
| 2011/0198933 A1* | 8/2011 | Ishigaki | B60R 25/00 307/66 |
| 2012/0020126 A1 | 1/2012 | Moki | |
| 2013/0044519 A1 | 2/2013 | Teraura et al. | |
| 2013/0308344 A1* | 11/2013 | Rosado | H02M 3/33584 363/17 |
| 2014/0104890 A1* | 4/2014 | Matsubara | H02M 3/33584 363/17 |
| 2014/0133187 A1* | 5/2014 | Hirano | H02M 3/33592 363/17 |
| 2014/0185328 A1* | 7/2014 | Rosado | H02M 1/40 363/17 |
| 2014/0254209 A1 | 9/2014 | Takagi et al. | |

FOREIGN PATENT DOCUMENTS

| | | |
|---|---|---|
| JP | 2011-234541 A | 11/2011 |
| JP | 2012-125040 A | 6/2012 |
| JP | 2014-176190 A | 9/2014 |
| WO | 2010/114088 A1 | 10/2010 |

OTHER PUBLICATIONS

Feb. 9, 2016 Office Action issued in Japanese Patent Application No. 2014-035186.

* cited by examiner

WAVEFORM WITHOUT CORRECTION TERM

WAVEFORM WITHOUT CORRECTION TERM

ELECTRIC POWER CONVERSION CIRCUIT SYSTEM

PRIORITY INFORMATION

This application claims priority to Japanese Patent Application No. 2014-035186 filed on Feb. 26, 2014, which is incorporated herein by reference in its entirety.

BACKGROUND

1. Technical Field

The present invention relates to an electric power conversion circuit system, and in particular, to an electric power conversion circuit system having a plurality of input/output ports.

2. Related Art

JP 2012-125040 A proposes an electric power conversion circuit system in which two types of circuits are integrated, taking advantage of magnetically coupled reactors showing different inductances in the current directions. The system has a structure in which coupled reactors are placed on both ends of a transformer, and are connected to full-bridge circuits. In this structure, a maximum of four direct current ports are provided in one circuit. When electric power is transmitted between the left and right full-bridge circuits connected on the respective ends of the transformer, if the duty ratios (Duty) are the same, high-efficiency electric power transmission is possible.

As described above, the electric power can be transmitted with high efficiency from one full-bridge circuit to the other if the duty ratios of the left and right full-bridge circuits are the same. However, when the duty ratios differ from each other, a current during a non-transmission period is increased, and the conversion efficiency is significantly reduced. Therefore, there is a restriction to set equal duty ratios between the left and right full-bridge circuits, which means that the voltage value of the direct current port connected to the intermediate point of the transformer cannot be arbitrarily selected.

In view of the above, the present inventors have proposed controlling a half-bridge phase difference between half-bridge circuits forming the full-bridge circuit, so that the reduction of the conversion efficiency can be inhibited even when the duty ratios differ between the full-bridge circuits. However, in this related art that was proposed (not yet made public at the time of filing of the present application) also, the advantages may be insufficient, and a further improvement in efficiency is desired. In particular, there is a problem in that the efficiency may be reduced when there is a dead-time period or when the power supply voltage changes.

The present invention advantageously provides an electric power conversion circuit system having a plurality of input/output ports, that can transfer the electric power with high efficiency even during a dead-time period or even when the power supply voltage changes.

SUMMARY

According to one aspect of the present invention, there is provided an electric power conversion circuit system comprising: a primary side electric power conversion circuit; a secondary side electric power conversion circuit magnetically coupled to the primary side electric power conversion circuit; and a control circuit that controls transmission of electric power between the primary side electric power conversion circuit and the secondary side electric power conversion circuit. The primary side electric power conversion circuit comprises, between a primary side positive electrode bus and a primary side negative electrode bus, a left arm, a right arm, and a primary side coil, wherein the left arm comprises an upper-left-arm transistor and a lower-left-arm transistor connected in series, the right arm comprises an upper-right-arm transistor and a lower-right-arm transistor connected in series, and the primary side coil is connected between a connection point of the left arm and a connection point of the right arm. The secondary side electric power conversion circuit comprises, between a secondary side positive electrode bus and a secondary side negative electrode bus, a left arm, a right arm, and a secondary side coil, wherein the left arm comprises an upper-left-arm transistor and a lower-left-arm transistor connected in series, the right arm comprises an upper-right-arm transistor and a lower-right-arm transistor connected in series, and the secondary side coil is connected between a connection point of the left arm and a connection point of the right arm. The control circuit sets at least one of a half-bridge phase difference between the lower-left-arm transistor and the lower-right-arm transistor of the primary side electric power conversion circuit and a half-bridge phase difference between the lower-left-arm transistor and the lower-right-arm transistor of the secondary side electric power conversion circuit based on OFF periods of the primary side electric power conversion circuit and the secondary side electric power conversion circuit and based on dead-times of the primary side electric power conversion circuit and the secondary side electric power conversion circuit, so that, when a duty ratio between the left arm and the right arm of the primary side electric power conversion circuit differs from a duty ratio between the left arm and the right arm of the secondary side electric power conversion circuit, a current between the primary side electric power conversion circuit and the secondary side electric power conversion circuit is zero in a non-transmission period of the electric power.

According to another aspect of the present invention, preferably, the control circuit sets at least one of the half-bridge phase difference between the lower-left-arm transistor and the lower-right-arm transistor of the primary side electric power conversion circuit and the half-bridge phase difference between the lower-left-arm transistor and the lower-right-arm transistor of the secondary side electric power conversion circuit based further on an amount of change of an input voltage.

According to another aspect of the present invention, preferably, the control circuit sets the half-bridge phase difference between the lower-left-arm transistor and the lower-right-arm transistor of the primary side electric power conversion circuit based on the OFF period of the secondary side electric power conversion circuit, and the control circuit sets the half-bridge phase difference between the lower-left-arm transistor and the lower-right-arm transistor of the secondary side electric power conversion circuit based on the OFF period and the dead-time of the primary side electric power conversion circuit.

According to another aspect of the present invention, preferably, the control circuit sets the half-bridge phase difference between the lower-left-arm transistor and the lower-right-arm transistor of the primary side electric power conversion circuit based on the OFF period of the secondary side electric power conversion circuit, and the control circuit sets the half-bridge phase difference between the lower-left-arm transistor and the lower-right-arm transistor of the secondary side electric power conversion circuit based on the OFF period and the dead-time of the primary side electric power conversion circuit, and on the amount of change of the input voltage.

According to another aspect of the present invention, preferably, the primary side coil comprises a coil and a transformer-primary side coil magnetically coupled to each other, and the secondary side coil comprises a transformer-secondary side coil and a coil connected to an intermediate point of the transformer-secondary side coil.

According to another aspect of the present invention, preferably, the primary side coil comprises a transformer-primary side coil and a coil connected to an intermediate point of the transformer-primary side coil, and the secondary side coil comprises a coil and a transformer-secondary side coil magnetically coupled to each other.

According to various aspects of the present invention, electric power can be transferred between the primary side and the secondary side with high efficiency even during the dead-time period and even when the power supply voltage changes. In addition, according to various aspects of the present invention, the number of magnetic elements through which an alternating current passes can be reduced and the conversion efficiency can be improved.

The present invention will be more clearly understood with reference to the embodiment described below. The embodiment, however, is described for more clearly understanding the invention, and is not intended to limit the scope of the present invention.

BRIEF DESCRIPTION OF THE DRAWINGS

Preferred embodiments of the present invention will be described in detail with reference to the following figures, wherein.

DETAILED DESCRIPTION

Preferred embodiments of the present invention will now be described with reference to the drawings. The electric power conversion circuit system according to the preferred embodiments of the present invention may be equipped in, for example, electricity-driven vehicles such as a hybrid electric vehicle and an electric automobile, but the present invention is not limited to such configurations.

<Presumed Circuit System>

First, a circuit system presumed in the present embodiment will be described.

Figure 1:
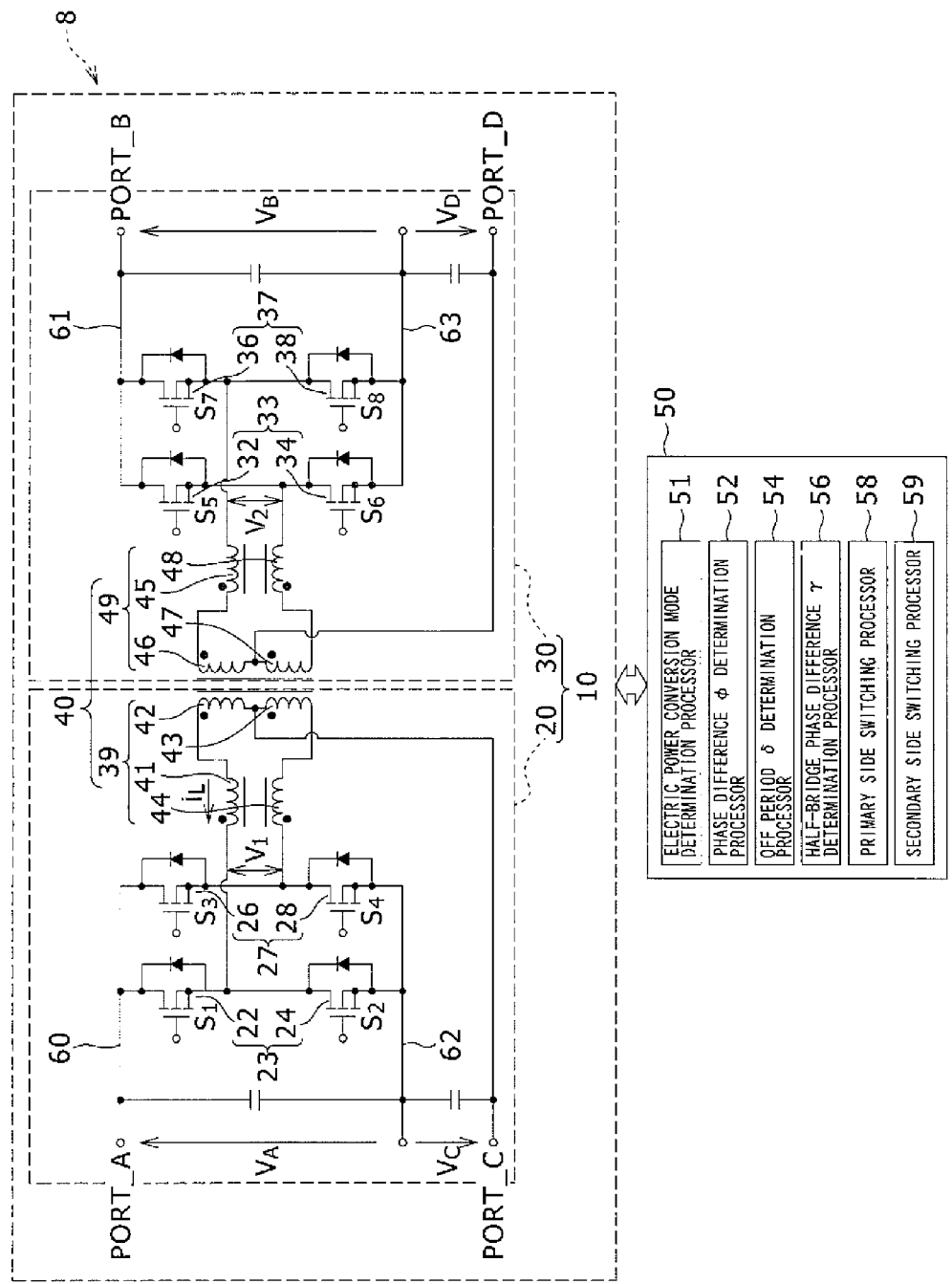
FIG. 1 is a diagram of a circuit system structure presumed in a preferred embodiment of the present invention.

FIG. 1 shows an electric power conversion circuit system presumed in the present embodiment. The electric power conversion circuit system 8 has an electric power conversion device 10 and a control circuit 50. The electric power conversion device 10 has four input/output ports; two input/output ports A~D are selected from the four input/output ports, and electric power is converted between the two selected input/output ports. The electric power conversion device 10 has a primary side electric power conversion circuit 20 and a secondary side electric power conversion circuit 30, and the primary side electric power conversion circuit 20 and the secondary side electric power conversion circuit 30 are magnetically coupled to each other by a transformer 40.

A primary side left arm 23 and a primary side right arm 27 are connected in parallel to each other between a primary side positive electrode bus 60 and a primary side negative electrode bus 62. The primary side left arm 23 includes a primary side upper-left-arm transistor 22 and a primary side lower-left-arm transistor 24 connected in series to each other. The primary side right arm 27 includes a primary side upper-right-arm transistor 26 and a primary side lower-right-arm transistor 28 connected in series to each other.

The input/output port A (PORT_A) is provided between the primary side positive electrode bus 60 and the primary side negative electrode bus 62. The input/output port C (PORT_C) is provided between the primary side negative electrode bus 62 and a center tap which is a connection point of coils 42 and 43. The secondary side electric power conversion circuit 30 has a similar structure. Loads and power supplies are connected to the input/output ports A, B, C, and D.

The transformer 40 includes a primary side coil 39 and a secondary side coil 49. The primary side coil 39 is formed by coils 41~44 connected in series, and the secondary side coil 49 is formed by coils 45~48 connected in series. The coils 41 and 44 form a coupling reactor on the primary side, and the coils 45 and 48 form a coupling reactor on the secondary side.

The control circuit 50 sets various parameters for controlling the electric power conversion circuit 10, and executes switching control of switching transistors of the primary side electric power conversion circuit 20 and the secondary side electric power conversion circuit 30. The control circuit 50 includes an electric power conversion mode determination processor 51, a phase difference φ determination processor 52, an OFF period δ determination processor 54, a half-bridge phase difference γ determination processor 56, a primary side switching processor 58, and a secondary side switching processor 59.

The electric power conversion mode determination processor selects, from among the input/output ports A~D, two input/output ports, based on a mode signal from outside (not shown), and sets a mode for electric power conversion between the two selected input/output ports. One of the electric power conversion modes is a bidirectional electric power transmission mode between the input/output port A and the input/output port B (this mode will hereinafter be referred to as an insulating converter mode). The other electric power conversion modes are modes in which the voltage is increased or decreased between the input/output ports A and C, or between the input/output ports B and D (these modes will hereinafter be referred to as voltage increasing/decreasing converter modes).

The phase difference φ determination processor 52 sets a phase difference φ of switching periods of switching transistors between the primary side electric power conversion circuit 20 and the secondary side electric power conversion circuit 30 so that the electric power conversion device 10 may function as a DC-to-DC converter circuit. The phase difference φ is a phase difference of voltage waveforms of a two-end voltage $V_1$ of the primary side coil 39 and a two-end voltage $V_2$ of the secondary side coil 49.

The OFF period δ determination processor 54 sets an OFF period δ (duty ratio) of the switching transistor of the primary side electric power conversion circuit 20 and the secondary side electric power conversion circuit 30 so that the primary side electric power conversion circuit 20 and the secondary side electric power conversion circuit 30 may function as a voltage increasing/decreasing circuit.

The half-bridge phase difference γ determination processor 56 sets a half-bridge phase difference of the primary side electric power conversion circuit 20 and a half-bridge phase difference of the secondary side electric power conversion circuit 30 so that a circulating current during a non-transmission period is zero even when the phase difference φ of the voltage waveforms of the two-end voltage $V_1$ and the two-end voltage $V_2$ is zero and the duty ratios of the voltage waveforms differ between the primary side and the secondary side. The half-bridge phase difference on the primary side is a phase difference of switching control between the primary side left arm 23 and the primary side right arm 27 (phase difference between half-bridges), and more specifically, is a phase difference of the switching control between the primary side lower-left-arm transistor 24 and the primary side lower-right-arm transistor 28. The half-bridge phase difference γ2 on the secondary side is a phase difference of switching control between the secondary side left arm 33 and the secondary side right arm 37 (phase difference between half-bridge circuits), and more specifically, is a phase difference of the switching control between the secondary side lower-left-arm transistor 34 and the secondary side lower-right-arm transistor 38.

The primary side switching processor 58 applies switching control of the switching transistors of the primary side left arm 23 and the primary side right arm 27 based on outputs of the electric power conversion mode determination processor 51, the phase difference φ determination processor 52, the OFF period δ determination processor 54, and the half-bridge phase difference γ determination processor 56.

The secondary side switching processor 59 applies switching control of the switching transistors of the secondary side left arm 33 and the secondary side right arm 37 based on outputs of the electric power conversion mode determination processor 51, the phase difference φ determination processor 52, the OFF period δ determination processor 54, and the half-bridge phase difference γ determination processor 56.

Figure 2:
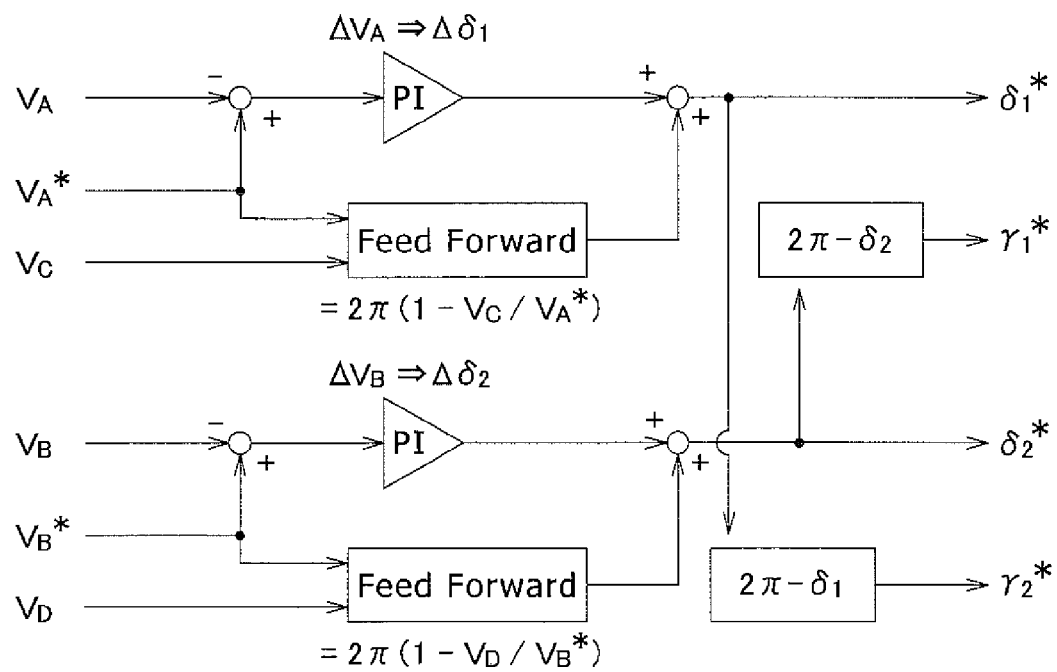
FIG. 2 is a functional block diagram of an OFF period δ determination processor and a half-bridge phase difference γ determination processor in FIG. 1.

FIG. 2 shows a functional block diagram of the OFF period δ determination processor 54 and the half-bridge phase difference γ determination processor 56. In FIG. 2, an asterisk (*) indicates a command value.

The OFF period δ determination processor 54 adds a value determined by applying a feed-forward control using a relationship formula $2\pi(1-V_C/V_A^*)$ for a voltage command value $V_A^*$ and a voltage value $V_C$, and a value $\Delta\delta_1$ determined by applying a PI control based on the voltage value $V_A$, to determine an OFF period command value (primary side duty command value) $\delta_1^*$ of the primary side electric power conversion circuit 20. In addition, the OFF period δ determination processor 54 adds a value determined by applying a feed-forward control using a relationship formula $2\pi(1-V_D/V_B^*)$ for a voltage command value $V_B^*$ and a voltage value $V_D$ and a value $\Delta\delta_2$ determined by applying a PI control based on the voltage value $V_B$, to determine an OFF period command value (secondary side duty command value) $\delta_2^*$ of the secondary side electric power conversion circuit 30. With this configuration, even if there is a change in the loads connected to the input/output ports A and B, the OFF period command values (duty command values) $\delta_1^*$ and $\delta_2^*$ can be determined in consideration of the voltage values $V_A$ and $V_B$ which have changed with the change of the loads.

The half-bridge phase difference γ determination processor 56 determines a half-bridge phase difference command value $\gamma_1^*$ on the primary side using a relationship formula $\gamma_1^*=2\pi-\delta_2^*$. The half-bridge difference γ determination processor 56 also determines a half-bridge phase difference command value $\gamma_2^*$ on the secondary side using a relationship formula $\gamma_2^*=2\pi-\delta_1^*$.

The control circuit 50 may be realized by an ECU having a processor and a memory and that executes a computer program stored in a program memory. The processes may be distributed over a plurality of processors, or a part of the functions of the control circuit 50 may be realized by a dedicated hardware.

Operations of two modes; that is, the voltage increasing/decreasing converter mode, and the insulating converter mode in such a circuit system structure will now be described.

First, in the voltage increasing/decreasing converter mode, for example, when the input/output port C and the input/output port A on the primary side are considered, the input/output port C is connected to an up-and-down connection point of the primary side left arm 23 via the coils 41 and 42 of the primary side coil 39. Because the ends of the primary side left arm 23 are connected to the input/output port A, a voltage increasing/decreasing circuit would be connected between the input/output port C and the input/output port A. In addition, the input/output port C is connected to an up-and-down connection point of the primary side right arm 27. Because the ends of the primary side right arm 27 are also connected to the input/output port A, another voltage increasing/decreasing circuit would be connected between the input/output port C and the input/output port A. Thus, two voltage increasing/decreasing circuits are connected in parallel to each other between the input/output port C and the input/output port A. Similarly, in the secondary side electric power conversion circuit 30 also, two voltage increasing/decreasing circuits are connected in parallel in the left and right arms 33 and 37, between the input/output port D and the input/output port B.

Next, in the insulating converter mode, if the input/output port A on the primary side and the input/output port B on the secondary side are considered, the primary side coil 39 is connected to the input/output port A, and the secondary side coil 49 is connected to the input/output port B. Therefore, by adjusting a phase difference φ of the switching period of the primary side electric power conversion circuit 20 and the secondary side electric power conversion circuit 30, it is possible to convert the electric power which is input to the input/output port A and transmit the converted electric power to the input/output port B, or to convert the electric power which is input to the input/output port B and transmit the converted electric power to the input/output port A. In other words, if the two-end voltage $V_1$ of the primary side is an advanced phase with respect to the two-end voltage v2 on the secondary side, the electric power can be transmitted from the primary side electric power conversion circuit 20 to the secondary side electric power conversion circuit 30, and, if the two-end voltage $V_2$ on the secondary side is an advanced phase with respect to the two-end voltage $V_1$ on the primary side, the electric power can be transmitted from the secondary side electric power conversion circuit 30 to the primary side electric power conversion circuit 20.

In the insulating converter mode, when the primary side duty command value $\delta_1^*$ and the secondary side duty command value $\delta_2^*$ are the same, there is no problem. However, when the duty command values differ between the primary side and the secondary side, the two-end voltage $V_1$ on the primary side and the two-end voltage $V_2$ on the secondary side have different voltage waveforms, and, even if the phase difference φ is set to 0, electric power would be transmitted between the primary side electric power conversion circuit 20 and the secondary side electric power conversion circuit 30, and the transmission cannot be controlled by the adjustment of the phase difference φ. This causes a restriction in that the duty ratio of the primary side and the duty ratio of the secondary side must always be set equal to each other.

However, by calculating the primary side half-bridge phase difference command value based on the relationship formula of $\gamma_1^*=2\pi-\delta_2^*$ and calculating the secondary side half-bridge phase difference command value using the relationship formula of $\gamma_2^*=2\pi-\delta_1^*$; that is, by setting the primary side half-bridge phase difference command value in consideration of the secondary side duty command value and setting the secondary side half-bridge phase difference command value in consideration of the primary side duty command value, it becomes possible to set the voltage waveforms of the two-end voltages $V_1$ and $V_2$ to be the same even when the duty command values differ between the primary side and the secondary side. This means that, with this configuration, there is no restriction that the duty ratios must be set equal between the primary side and the secondary side.

The above-described system is the presumed circuit structure system, and the present embodiment further improves such a circuit structure system.

<Circuit Structure System of Present Embodiment>

Figure 3:
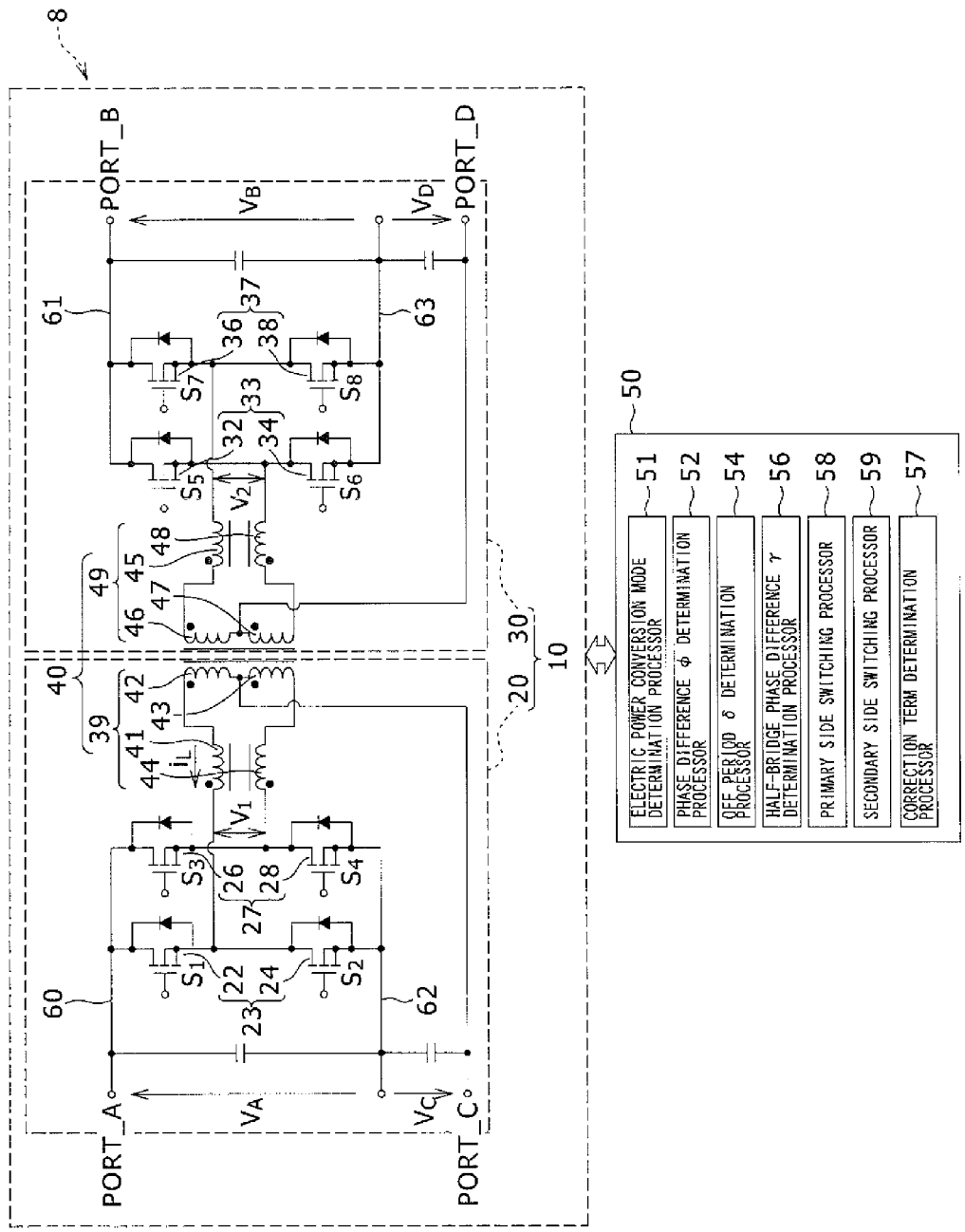
FIG. 3 is a diagram of a circuit system structure of a preferred embodiment of the present invention.

FIG. 3 shows an electric power conversion circuit system 8 of the present embodiment presuming the circuit system structure described above. In addition to the structure of FIG. 1, a correction term determination processor 57 is added to the control circuit 50.

An example configuration will be described in which a direct current power supply is connected to the input/output port B on the secondary side, and electric power is transmitted to the input/output port A on the primary side.

Figure 4:
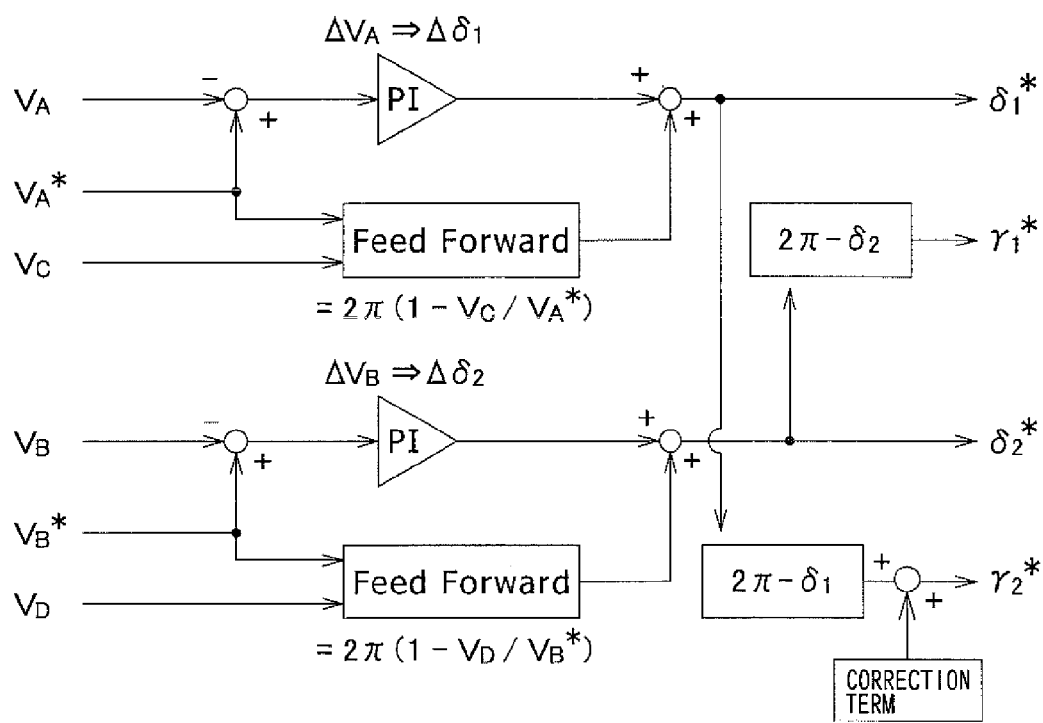
FIG. 4 is a functional block diagram of an OFF period δ determination processor and a half-bridge phase difference γ determination processor of FIG. 3.

As shown in FIG. 4, the correction term determination processor 57 is a functional block that corrects the half-bridge phase difference command value calculated by the half-bridge phase difference γ determination processor 56, and further corrects the half-bridge phase difference command values calculated using relationship formulae $\gamma_1^*=2\pi-\delta_2^*$ and $\gamma_2^*=2\pi-\delta_1^*$. Specifically, as the voltage waveforms of the two-end voltages $V_1$ and $V_2$ may change during the dead-time period or due to a change in the input voltage, resulting in different voltage waveforms, the half-bridge phase difference command values are corrected in consideration of influences of these, to more precisely coincide the voltage waveforms of the two-end voltages $V_1$ and $V_2$.

The correction term determination processor 57 specifically determines a correction term based on the following formula:

$$\Delta\gamma_2 = dt\cdot\omega_{SW}+(2\pi-\delta_1^*)\{1-NV_A/V_B\} \qquad (1)$$

where dt represents the dead-time, $\omega_{SW}$ represents a switching angle frequency, N represents a ratio of number of windings of the transformer 40, $V_A$ represents the primary side voltage, and $V_B$ represents the secondary side voltage.

The correction term determination processor 57 then applies the correction by adding the correction term to the command value calculated by $\gamma_2^*=2\pi-\delta_1^*$. In other words, the correction term determination processor 57 calculates the half-bridge phase difference command value using the relationship formulae:

$$\gamma_1^* = 2\Pi - \delta_2^*$$

$$\begin{aligned}\gamma_2^* &= 2\Pi - \delta_1^* + \Delta\gamma_2 \\ &= 2\Pi - \delta_1^* + dt\cdot\omega_{sw} + (2\Pi - \delta_1^*)(1 - NV_A/V_B)\end{aligned}$$

The first term on the right side of the above-described formula (1) is a correction term corresponding to the dead-time, and the second term on the right side is a correction term corresponding to a change of the input voltage.

Next, the correction term $\Delta\gamma_2$ will be described in detail, separately for the first term and the second term on the right side of the formula.

<First Term on Right Side: Dead-Time Correction Term>

Figure 5:
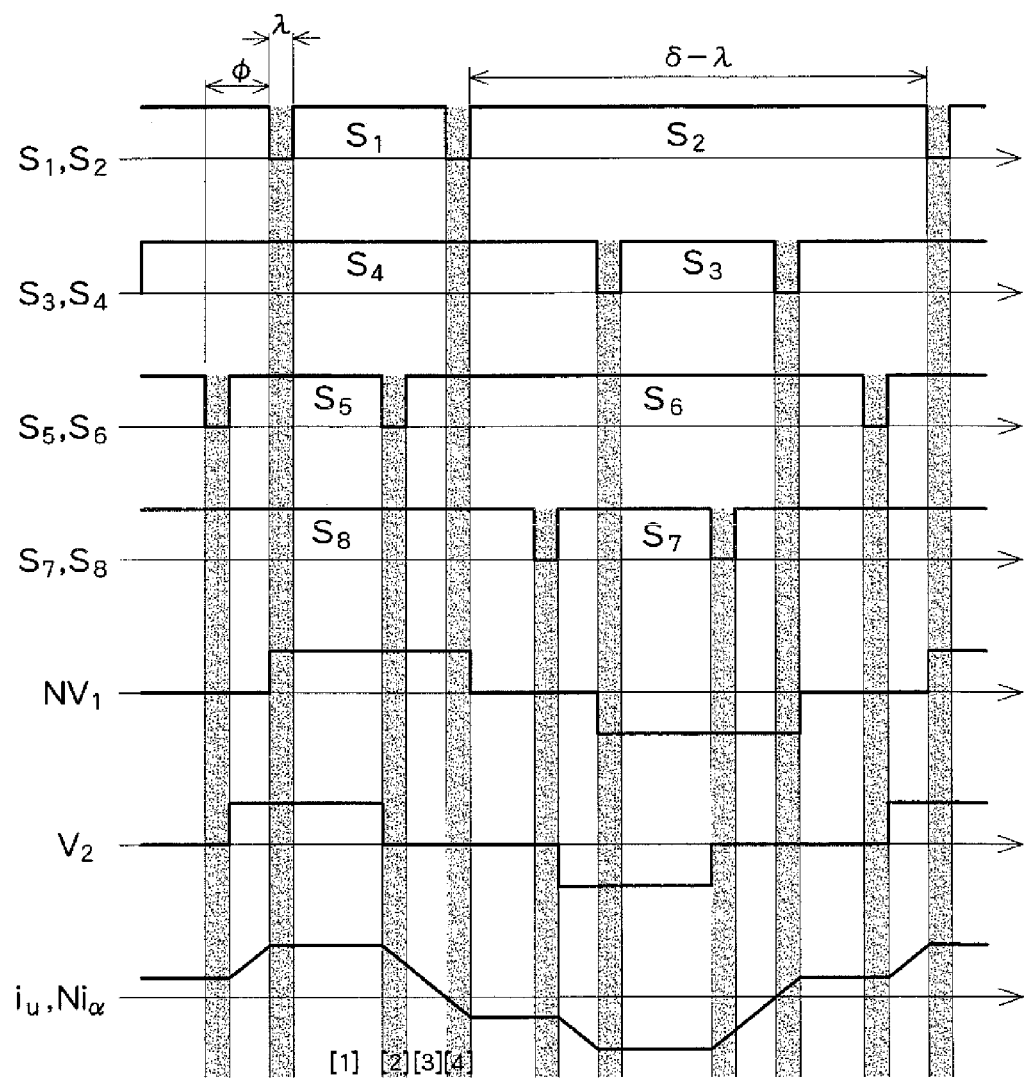
FIG. 5 is a timing chart in a preferred embodiment of the present invention.

FIG. 5 shows operation waveforms of switching transistors when electric power is transmitted from the secondary side to the primary side. In FIG. 5, S1~S4 correspond to the switching transistors 22, 24, 26, and 28 of the primary side electric power conversion circuit 20, and S5~S8 correspond to the switching transistors 32, 34, 36, and 38 of the secondary side electric power conversion circuit 30 (refer to FIG. 1). In FIG. 5, "S1 S2" represents a switching timing of S1 and S2. The switching transistors S1 and S2 are alternately switched ON and OFF. The descriptions of "S3, S4", "S5, S6", and "S7, S8" are similar to the above. The description of "$NV_1$" represents a voltage waveform shown by a product of the primary side voltage; that is, the two-end voltage $V_2$, and the number of windings of the transformer N, "$V_2$" represents a voltage waveform of the two-end voltage $V_2$ on the secondary side, and "$i_u$" represents a current on the primary side.

A hatched portion corresponds to the dead-time period. In FIG. 5, the phase difference φ and the length λ of the dead-time period are also shown. In addition, periods [1]~[4] are shown as examples.

Figure 6:
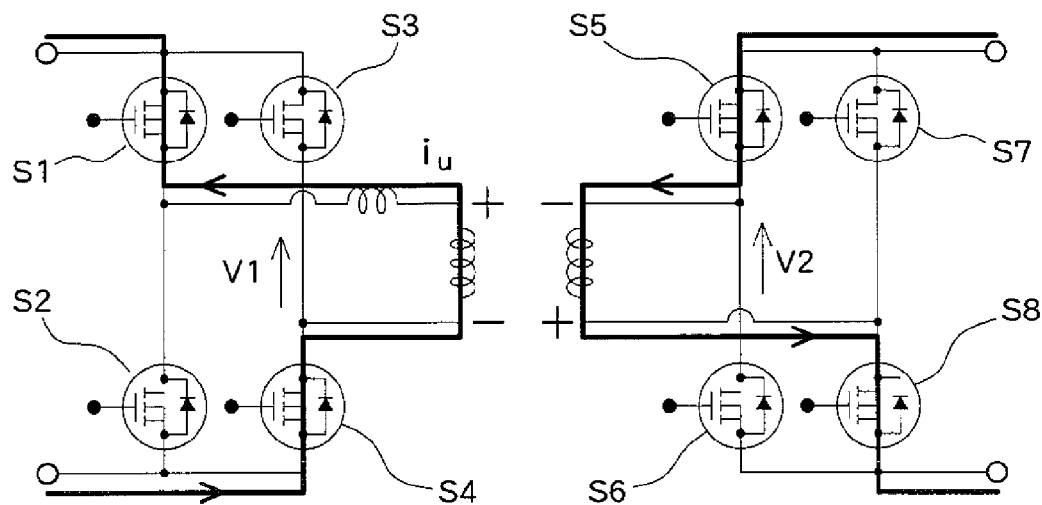
FIG. 6 is an explanatory diagram of an ON-OFF control in a period [1]

FIG. 6 shows ON-OFF states of the switching transistors S1~S8 in the period [1] of FIG. 5. The switching transistors S1, S4, S5, and S8 re in the ON state, and the other switching transistors are in the OFF state. The flow of current in this case is as shown in FIG. 6. On the secondary side (power sending side), because the switching transistors S5 and S8 are ON, a current flows from S5 to the coils 46 and 47 and further to S8 (S5→46, 47→S8). Similarly, on the primary side (power receiving side), because the switching transistors S1 and S4 are ON, a current flows from S4 to the coils 42 and 43 and further to S1 (S4→42, 43→S1).

Figure 7:
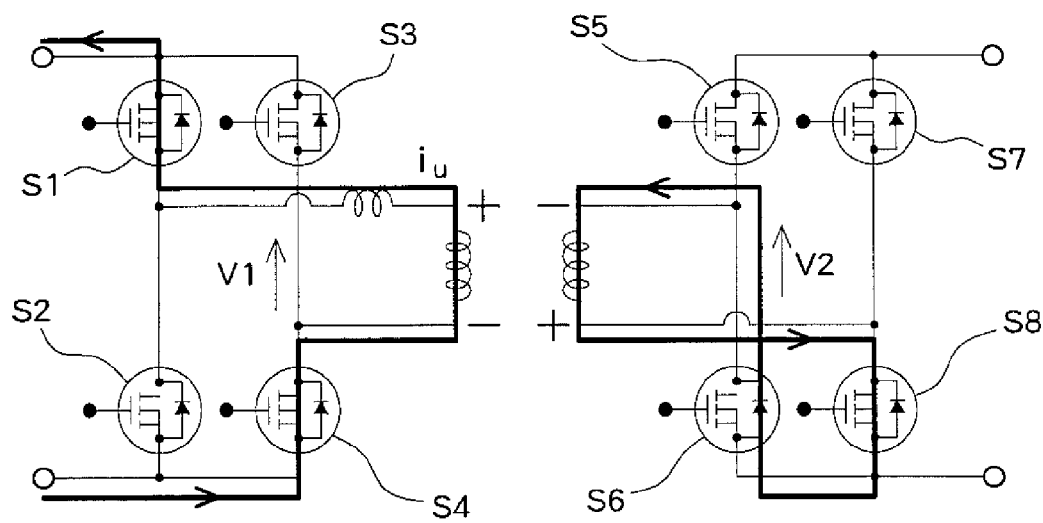
FIG. 7 is an explanatory diagram of an ON-OFF control in a period [2]

FIG. 7 shows ON-OFF states of switching transistors S1 S8 in the period [2] of FIG. 5. The switching transistors S1, S4, and S8 are in the ON state, and the other switching transistors are in the OFF state. In the period [2], compared to the period [1], the switching transistor S5 is transitioned from the ON state to the OFF state. When S5 on the secondary side (power sending side) is switched OFF, a current continues to flow through a diode connected in parallel to S6, and the two-end voltage $V_2$ on the secondary side is reduced to zero. Therefore, the ON-OFF of S5 of the upper arm determines the two-end voltage $V_2$ on the secondary side (power sending side).

Figure 8:
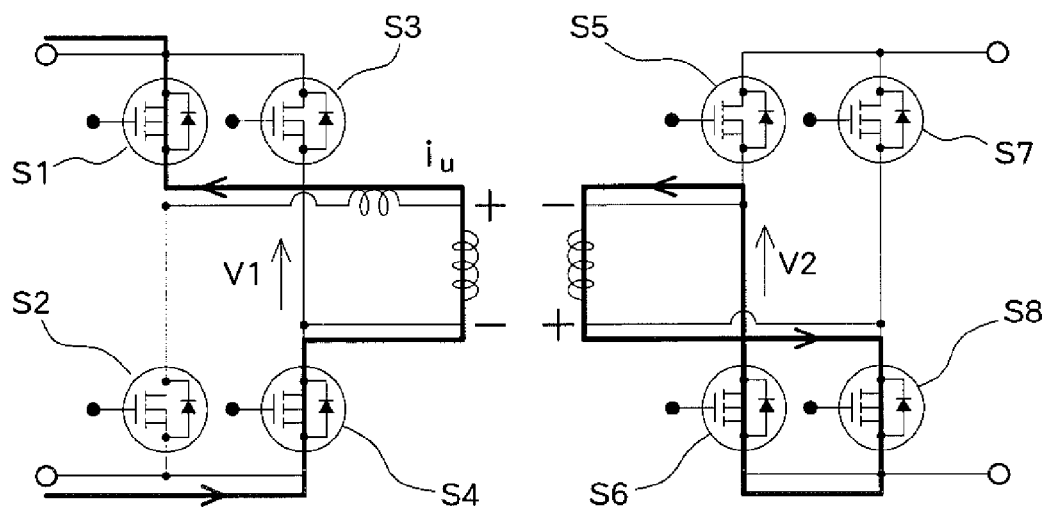
FIG. 8 is an explanatory diagram of an ON-OFF control in a period [3]

FIG. 8 shows ON-OFF states of the switching transistors S1~S8 in a period [3] of FIG. 5. The switching transistors S1, S4, S6, and S8 are in the ON state, and the other switching transistors are in the OFF state.

Figure 9:
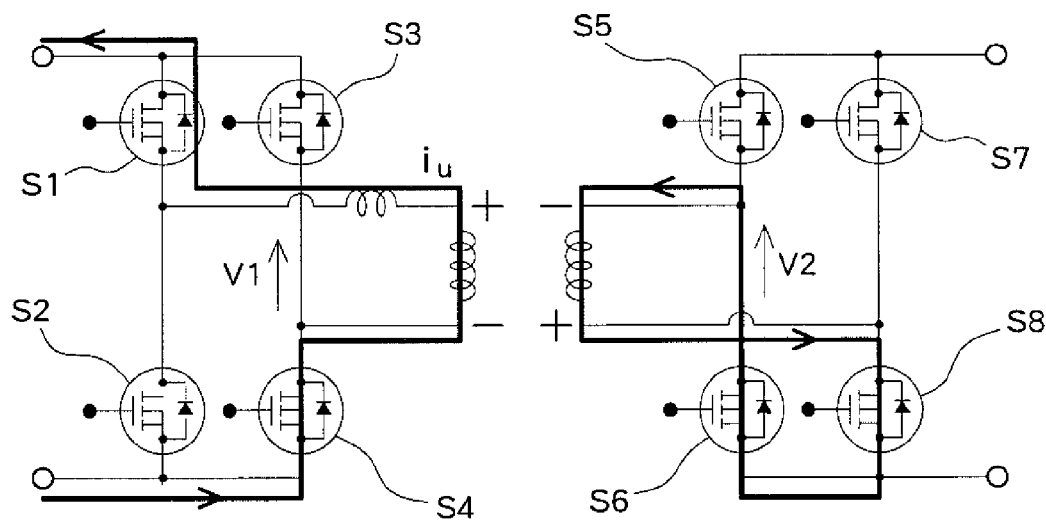
FIG. 9 is an explanatory diagram of an ON-OFF control in a period [4]

FIG. 9 shows ON-OFF states of the switching transistors S1~S8 in a period [4] of FIG. 5. The switching transistors S4, S6, and S8 are in the ON state, and the other switching transistors are in the OFF state. In the period [4], compared to the period [3], the switching transistors S1 is transitioned from the ON state to the OFF state. When S1 on the primary side (power receiving side) is switched OFF, a current continues to flow through a diode connected in parallel to S1, and the two-end voltage $V_1$ on the primary side does not become zero unless S2 is switched ON. Therefore, the ON-OFF of S2 on the lower arm determines the two-end voltage $V_1$ on the primary side (power receiving side).

Normally, in a circuit system having a half-bridge circuit as shown in FIG. 3, a dead-time of a few hundreds of nanoseconds to a few microseconds is provided, so that the upper and lower switching transistors are not short-circuited. This is the reason why, in FIG. 5, dead-time periods are provided in which S1 and S2 are both switched OFF, S3 and S4 are both switched OFF, S5 and S6 are both switched OFF, and S7 and S8 are both switched OFF. On the other hand, when the dead-time is provided, as described above, the arms that determine the two-end voltages $V_1$ and $V_2$ of the transformer 40 differ between the power sending side and the power receiving side. Therefore, a difference is caused in the pulse width between the two-end voltages $V_1$ and $V_2$. Specifically, the pulse width on the secondary side (power sending side) is trimmed by the dead-time dt (the pulse width is reduced) as compared to the pulse width on the primary side (power receiving side).

Therefore, in order to realize a same waveform for the two-end voltages $V_1$ and $V_2$, the trimmed dead-time dt may be added to the pulse width of the two-end voltage $V_2$ on the secondary side (power sending side). Specifically, a dead-time correction term may be set as:

Dead-time correction term=$dt \cdot \omega_{SW}$

Figure 10A:
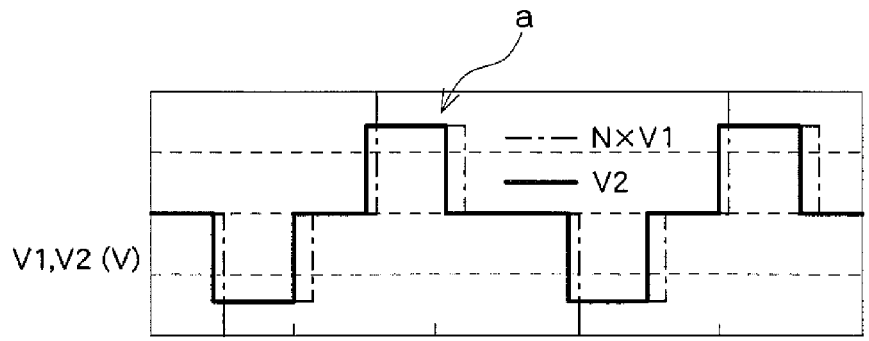
FIGS. 10A and 10B are explanatory diagrams of a waveform when there is no dead-time correction term.
Figure 10B:
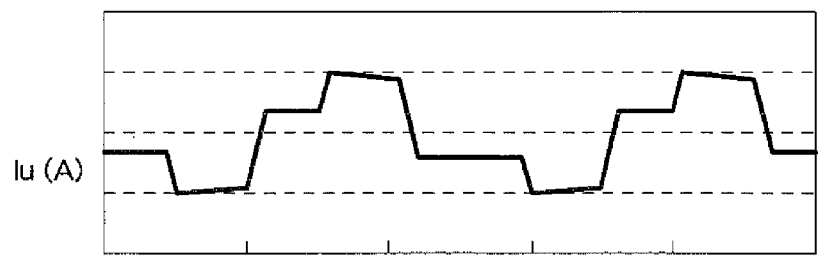

FIGS. 10A and 10B show a result of a computer simulation of voltage waveforms of the two-end voltages $V_1$ and $V_2$ and a current $i_u$ on the primary side when there is no dead-time correction term. These figures show a result in a case where dt≠0, $D_1$>$D_2$, and the number of windings=N. FIG. 10A shows the waveforms of the two-end voltages $V_1$ and $V_2$, and FIG. 10B shows a waveform of the primary side current $i_u$. It should be noted that the duty ratios on the primary side and the secondary side differ from each other. As can be understood from FIG. 10A, a difference is caused in the pulse width between $NV_1$ and $V_2$ as shown by "a" in FIG. 10A, and the pulse width is reduced for $V_2$. As can be understood from FIG. 10B, even when the two-end voltages $V_1$ and $V_2$ are zero, the primary side current iu is not set to zero, and a circulating current is caused in the non-transmission period. The circulating current is a current circulating in the primary side during the non-transmission period because the energy accumulated in an inductor during the transmission period cannot be fully output from the port on the primary side. Occurrence of such a circulating current results in reduction of the conversion efficiency.

Figure 11A:
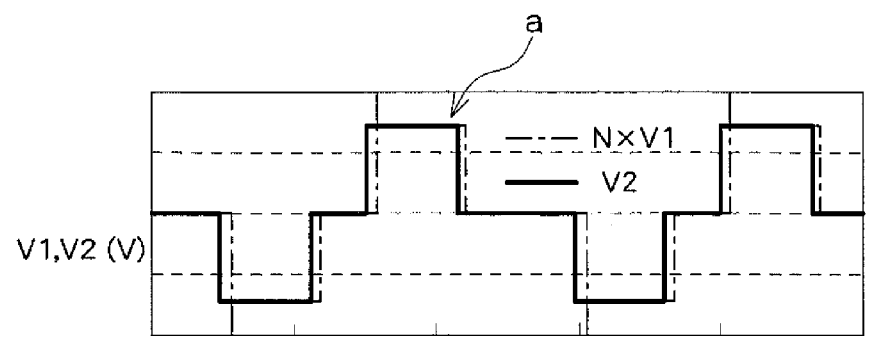
FIGS. 11A and 11B are explanatory diagrams of a waveform when there is a dead-time correction term.
Figure 11B:
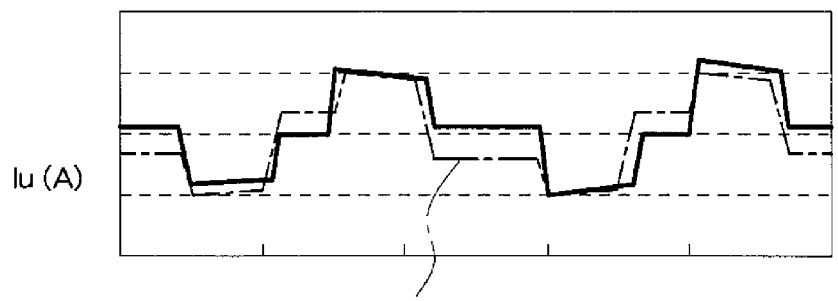

In contrast, FIGS. 11A and 11B show the voltage waveforms of the two-end voltages $V_1$ and $V_2$ and the current $i_u$ on the primary side when there is a dead-time correction term. FIG. 11A shows the waveforms of the two-end voltages $V_1$ and $V_2$, and FIG. 11B shows a waveform of the primary side current $i_u$. As can be understood from FIG. 11A, the difference in the pulse width between $NV_1$ and $V_2$ is corrected compared to FIG. 10A as shown by "a" in FIG. 11A, and the waveforms are approximately equal to each other. As can be understood from FIG. 11B, the circulating current in the non-transmission period is inhibited, and the conversion efficiency is improved.

<Second Term on Right Side: Voltage Change Correction Term>

With a change of the power supply voltage connected to the input/output port B also, a difference may be caused in the voltage waveforms of the two-end voltages $V_1$ and $V_2$, and a circulating current may be generated.

Figure 12:
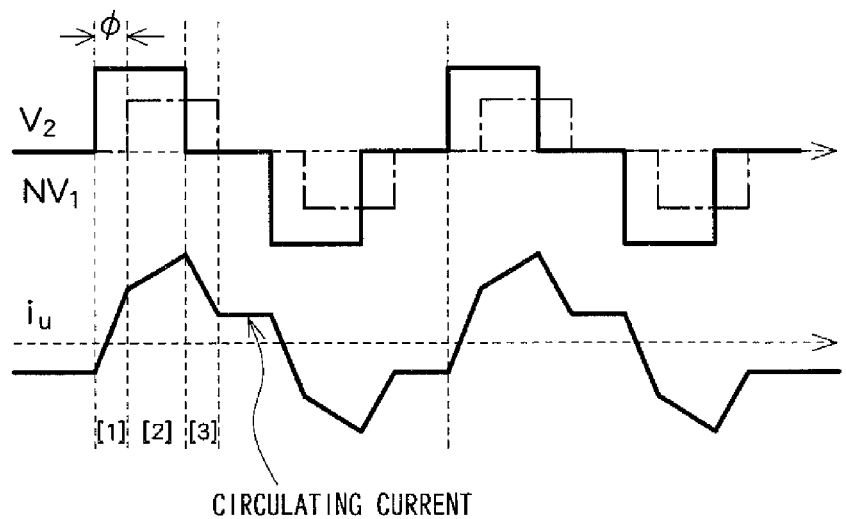
FIG. 12 is an explanatory diagram of a waveform when a power supply voltage is increased.

FIG. 12 shows voltage waveforms and the waveform of the primary side current $i_u$ when the power supply voltage $V_B$ of the input/output port B is increased and $NV_1$<$V_2$. The upper part shows the voltage waveforms of $V_2$ and $NV_1$, and the lower part shows the current waveform of $i_u$. As shown in the lower part, a circulating current is caused in the non-transmission period.

Figure 13:
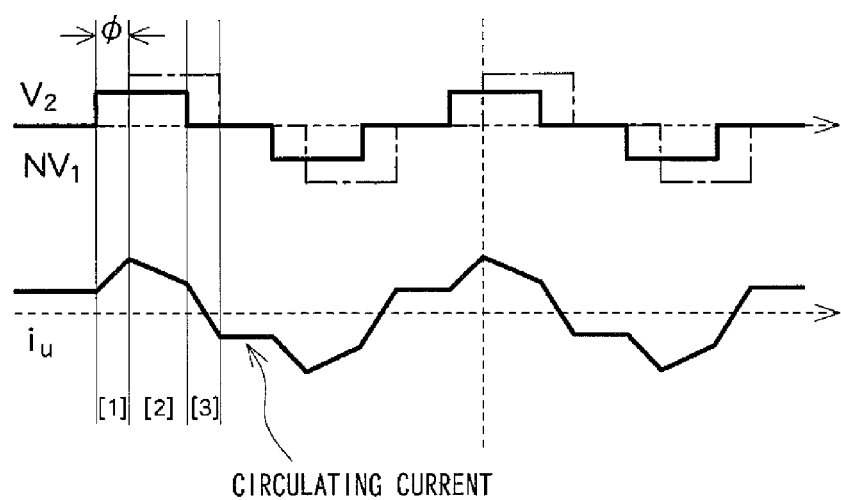
FIG. 13 is an explanatory diagram of a waveform when a power supply voltage is reduced.

FIG. 13 shows the voltage waveforms and the waveform of the primary side current $i_u$ when the power supply voltage $V_B$ of the input/output port B is reduced and $NV_1$>$V_2$. The upper part shows the voltage waveforms of $V_2$ and $NV_1$, and the lower part shows the current waveform of $i_u$. In this case also, as shown in the lower part, a circulating current is caused in the non-transmission period.

As described, when the power supply voltage is increased or decreased, a circulating current is caused. In order to inhibit the circulating current as shown in FIGS. 12 and 13, a total sum of the amount of change of the current in periods [1]~3] of FIGS. 12 and 13 may be set to zero. A pulse width correction necessary for setting the total sum to zero may be determined by:

Voltage change correction term=$(2\pi-\delta_1^*)(1-NV_A/V_B)$ $NV_A/V_B$ represents an amount of change of the input power supply voltage $V_B$ and the voltage change correction term is set according to the amount of change of the power supply voltage.

Figure 14A:
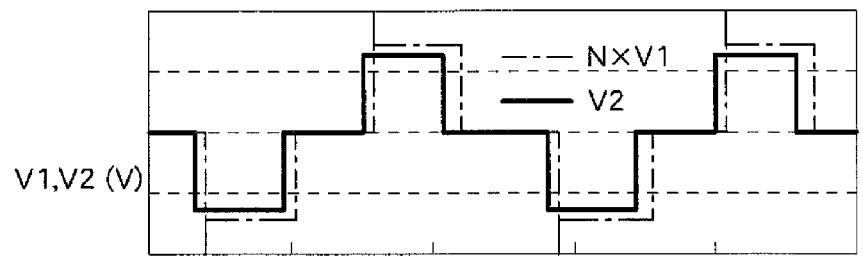
FIGS. 14A and 14B are explanatory diagrams of a waveform when there is no voltage change correction term.
Figure 14B:
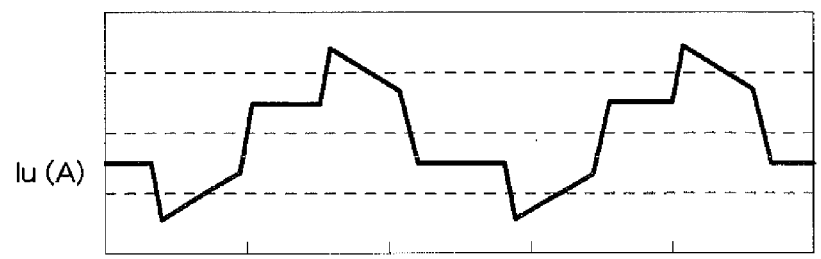

FIGS. 14A and 14B show a result of a simulation when there is no voltage change correction term and the power supply voltage $V_B$ connected to the input/output port B is reduced. FIG. 14A shows the waveforms of the two-end voltages $V_1$ and $V_2$, and FIG. 143 shows the waveform of the current $i_u$. A circulating current is caused in the non-transmission period.

Figure 15A:
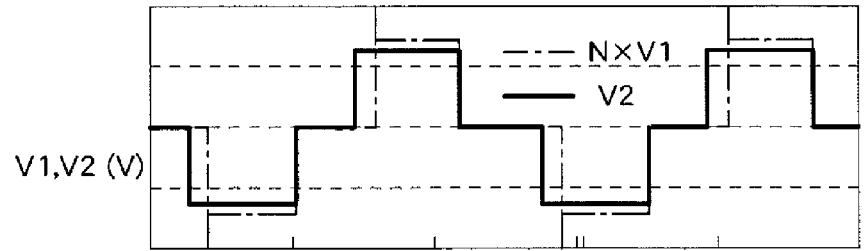
FIGS. 15A and 15B are explanatory diagrams of a waveform when there is a voltage change correction term.
Figure 15B:
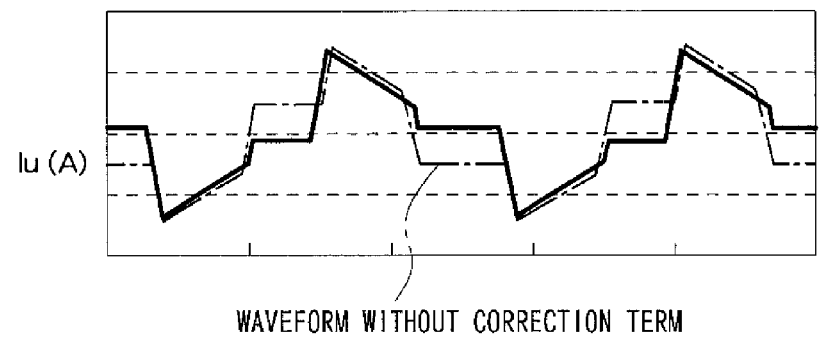

FIGS. 15A and 15B show a result of a simulation when there is a voltage change correction term and the power supply voltage $V_B$ connected to the input/output port B is reduced. FIG. 15A shows the waveforms of the two-end voltages $V_1$ and $V_1$, and FIG. 15B shows the waveform of the current $i_u$. The circulating current is inhibited even in the non-transmission period. This is similarly applicable for the case where the power supply voltage $V_B$ connected to the input/output port B is increased.

As described, in the present embodiment, the half-bridge phase difference command value is corrected using the dead-time correction term and the voltage change correction term in the condition when the primary side and the secondary side operate with different duty ratios. With such a configuration, even when there is a dead-time period or even when the power supply voltage changes, the circulating current in the non-transmission period can be inhibited and the conversion efficiency can be improved.

In the case where the power supply voltage is controlled, and there is no voltage change or the voltage change is sufficiently small that the voltage change may be ignored, the half-bridge phase difference command value may be corrected with only the dead-time correction term. In this case, the correction is:

$$\Delta \gamma_2 = dt \cdot \omega_{SW}$$

This is also clear in the above-described formula (1) showing that, when there is no change in the power supply voltage, $NV_A = V_B$ at the phase difference cp of zero and the voltage change correction term which is the second term on the right side is zero.

In addition, in the present embodiment, the half-bridge phase difference correction value $\gamma_2^*$ on the secondary side is corrected. Alternatively, the half-bridge phase difference command value $\gamma_1^*$ on the primary side May be corrected based on the dead-time and the amount of change of the power supply voltage, to realize equal voltage waveforms, or both the half-bridge phase difference command values $\gamma_1^*$ and $\gamma_2^*$ on the primary side and the secondary side may be corrected to realize equal voltage waveforms.

Figure 16:
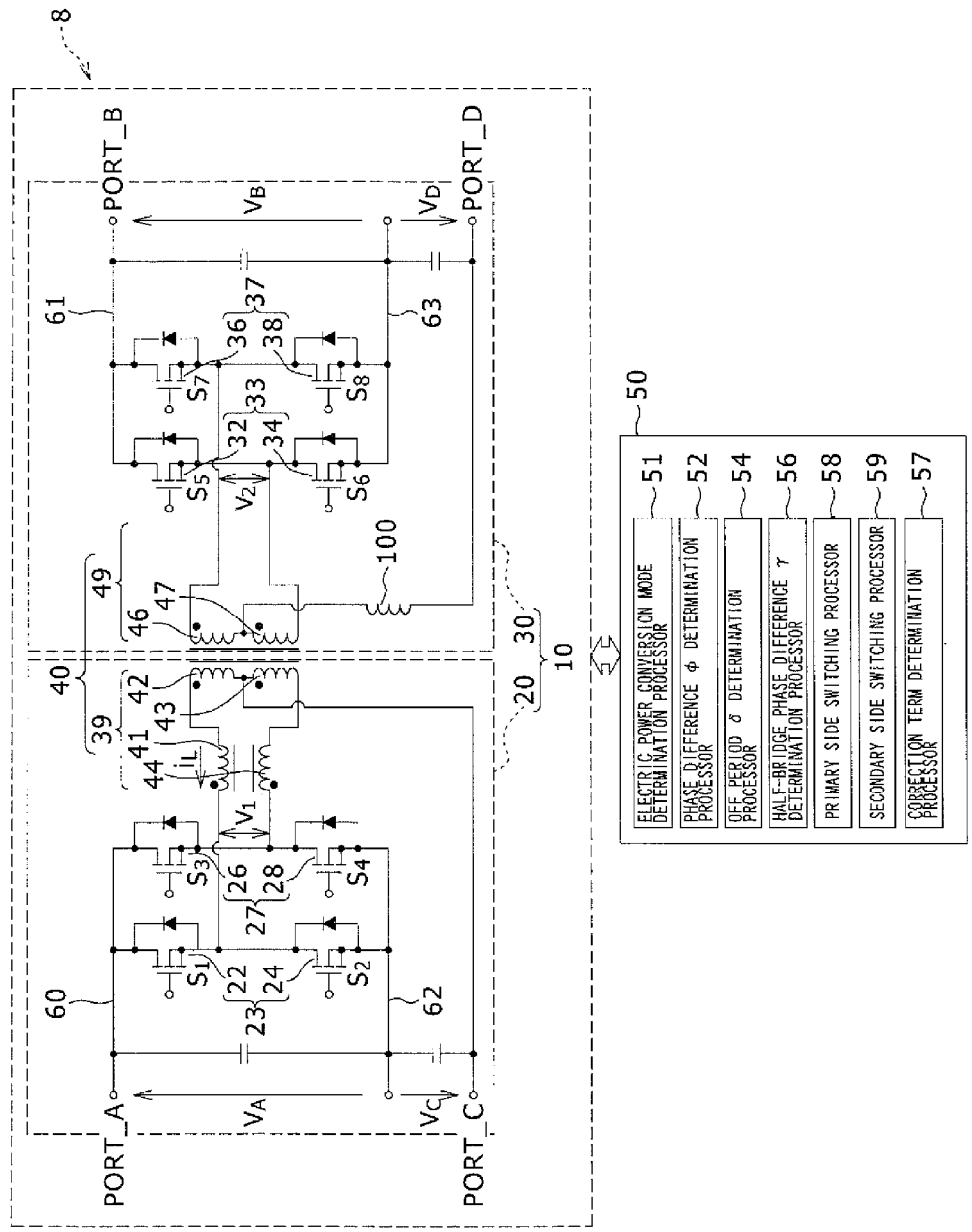
FIG. 16 is a diagram of a circuit system structure in another preferred embodiment of the present invention.
Figure 17:
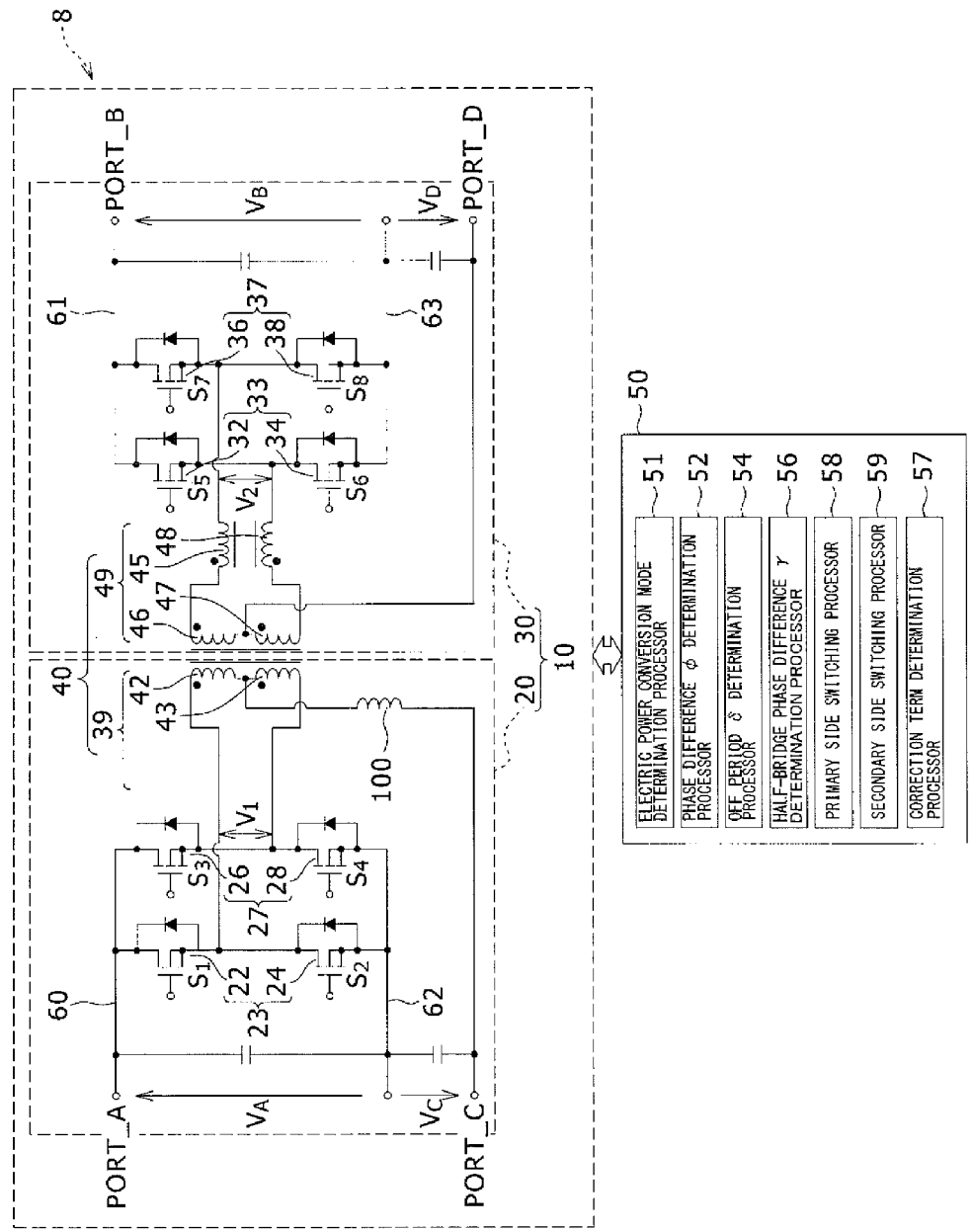
FIG. 17 is a diagram of a circuit system structure in yet another preferred embodiment of the present invention.

Moreover, in the present embodiment, when electric power is transmitted between the primary conversion circuit 20 and the secondary conversion circuit 30, the electric power passes through three magnetic elements including the coupling reactors 41 and 44, the primary side and secondary side coils 42, 43, 46, and 47, and coupling reactors 45 and 48, joule-heat is increased and a current ripple is increased in the control between the half-bridges. In consideration of this, as shown in FIG. 16, a configuration may be employed in which the coupling reactors 45 and 48 are omitted, a reactor 100 is connected to a connection point of the transformer-secondary side coils 46 and 47, an L value necessary for a one-side voltage increasing/decreasing converter mode and the insulating converter mode is realized by one of the coupling reactors 41 and 44, and the other voltage increasing/decreasing converter mode is realized by the reactor 100, so that the number of magnetic elements through which an alternating current passes is reduced and the conversion efficiency is further improved. In addition, with the reduction of the number of magnetic elements, there is an advantage that the circuit design is simplified. Alternatively, in FIG. 3, the coupling reactors 41 and 44 may be omitted and a reactor 100 may be connected to a connection point of the transformer-primary side coils 42 and 43. FIG. 17 shows a circuit system structure in this configuration. In summary, the coupling reactor on one of the primary side electric power conversion circuit 20 and the secondary side electric power conversion circuit 30 may be omitted, and a reactor may be connected to the connection point of the transformer coils in place thereof.

What is claimed is:

1. An electric power conversion circuit system, comprising:
    a primary side electric power conversion circuit;
    a secondary side electric power conversion circuit magnetically coupled to the primary side electric power conversion circuit; and
    a control circuit that controls transmission of electric power between the primary side electric power conversion circuit and the secondary side electric power conversion circuit, wherein
    the primary side electric power conversion circuit comprises, between a primary side positive electrode bus and a primary side negative electrode bus, a left arm, a right arm, and a primary side coil, wherein the left arm comprises an upper-left-arm transistor and a lower-left-arm transistor connected in series, the right arm comprises an upper-right-arm transistor and a lower-right-arm transistor connected in series, and the primary side coil is connected between a connection point of the left arm and a connection point of the right arm,
    the secondary side electric power conversion circuit comprises, between a secondary side positive electrode bus and a secondary side negative electrode bus, a left arm, a right arm, and a secondary side coil, wherein the left arm comprises an upper-left-arm transistor and a lower-left-arm transistor connected in series, the right arm comprises an upper-right-arm transistor and a lower-right-arm transistor connected in series, and the secondary side coil is connected between a connection point of the left arm and a connection point of the right arm, and
    the control circuit sets at least one of a half-bridge phase difference between the lower-left-arm transistor and the lower-right-arm transistor of the primary side electric power conversion circuit and a half-bridge phase difference between the lower-left-arm transistor and the lower-right-arm transistor of the secondary side electric power conversion circuit based on OFF periods of the primary side electric power conversion circuit and the secondary side electric power conversion circuit and based on dead-times of the primary side electric power conversion circuit and the secondary side electric power conversion circuit, so that, when a duty ratio between the left arm and the right arm of the primary side electric power conversion circuit differs from a duty ratio between the left arm and the right arm of the secondary side electric power conversion circuit, a current between the primary side electric power conversion circuit and the secondary side electric power conversion circuit is zero in a non-transmission period of the electric power.

2. The electric power conversion circuit system according to claim 1, wherein
    the control circuit sets at least one of the half-bridge phase difference between the lower-left-arm transistor and the lower-right-arm transistor of the primary side electric power conversion circuit and the half-bridge phase difference between the lower-left-arm transistor and the lower-right-arm transistor of the secondary side electric power conversion circuit based further on an amount of change of an input voltage.

3. The electric power conversion circuit system according to claim 1, wherein the control circuit sets the half-bridge phase difference between the lower-left-arm transistor and the lower-right-arm transistor of the primary side electric power conversion circuit based on the OFF period of the secondary side electric power. conversion circuit, and the control circuit sets the half-bridge phase difference between the lower-left-arm transistor and the lower-right-arm transistor of the secondary side electric power conversion circuit based on the OFF period and the dead-time of the primary side electric power conversion circuit.

4. The electric power conversion circuit system according to claim 2, wherein the control circuit sets the half-bridge phase difference between the lower-left-arm transistor and the lower-right-arm transistor of the primary side electric power conversion circuit based on the OFF period of the secondary side electric power conversion circuit, and the control circuit sets the half-bridge phase difference between the lower-left-arm transistor and the lower-right-arm transistor of the secondary side electric power conversion circuit based on the OFF period and the dead-time of the primary side electric power conversion circuit, and on the amount of change of the input voltage.

5. The electric power conversion circuit system according to claim 1, wherein the primary side coil comprises a coil and a transformer-primary side coil magnetically coupled to each other, and the secondary side coil comprises a transformer-secondary side coil and a coil connected to an intermediate point of the transformer-secondary-side coil.

6. The electric power conversion circuit system according to claim 1, wherein the primary side coil comprises a transformer-primary side coil and a coil connected to an intermediate point of the transformer-primary side coil, and the secondary side coil comprises a coil and a transformer-secondary side coil magnetically coupled to each other.

* * * * *